(12) United States Patent
Lee et al.

(10) Patent No.: US 12,531,313 B2
(45) Date of Patent: Jan. 20, 2026

(54) POROUS FRAME-BASED SOLID ELECTROLYTE MEMBRANE AND MANUFACTURING METHOD THEREOF, AND ALL-SOLID-STATE BATTERY INCLUDING THE SAME

(71) Applicants: ELECTRONICS AND TELECOMMUNICATIONS RESEARCH INSTITUTE, Daejeon (KR); Daegu Gyeongbuk Institute of Science and Technology, Daegu (KR); LG Energy Solution, LTD., Seoul (KR); INDUSTRY-UNIVERSITY COOPERATION FOUNDATION HANYANG UNIVERSITY ERICA CAMPUS, Ansan-si (KR)

(72) Inventors: Young-Gi Lee, Daejeon (KR); Seok Hun Kang, Daejeon (KR); Dohwan Kim, Hwaseong-si (KR); Dong Hyeon Kim, Gunpo-si (KR); Youngjoon Roh, Daejeon (KR); Jihun Song, Changwon-si (KR); Jinhyeok Ahn, Ansan-si (KR); Yong Min Lee, Daegu (KR); Eun Kwang Jang, Ansan-si (KR); Kuk Young Cho, Gwacheon-si (KR); Hoiju Choi, Ansan-si (KR); Hoe Jin Hah, Daejeon (KR)

(73) Assignees: Electronics and Telecommunications Research Institute, Daejeon (KR); Daegu Gyeongbuk Institute of Science and Technology, Daegu (KR); LG Energy Solution, LTD., Seoul (KR); Industy-University Cooperation Foundation Hanyang University Erica Campus, Ansan-si (KR)

( * ) Notice: Subject to any disclaimer, the term of this patent is extended or adjusted under 35 U.S.C. 154(b) by 46 days.

(21) Appl. No.: 17/525,858

(22) Filed: Nov. 12, 2021

(65) Prior Publication Data
US 2022/0271393 A1    Aug. 25, 2022

(30) Foreign Application Priority Data

Feb. 19, 2021   (KR) .................. 10-2021-0022855
May 11, 2021    (KR) .................. 10-2021-0060500

(51) Int. Cl.
*H01M 50/451*   (2021.01)
*H01M 50/403*   (2021.01)
*H01M 50/491*   (2021.01)

(52) U.S. Cl.
CPC ....... *H01M 50/451* (2021.01); *H01M 50/403* (2021.01); *H01M 50/491* (2021.01)

(58) Field of Classification Search
CPC . H01M 50/451; H01M 50/403; H01M 50/491
See application file for complete search history.

(56) References Cited

U.S. PATENT DOCUMENTS 12,183,882 B2   12/2024  Lee et al.
2012/0328961 A1*  12/2012  Lee .................. H01M 6/40
                                         429/347

(Continued)

FOREIGN PATENT DOCUMENTS

CN   108878751 A   11/2018
CN   112201851 A    1/2021

(Continued)

OTHER PUBLICATIONS

Nam, Young Jin et al., "Toward practical all-solid-state lithium-ion batteries with high energy density and safety: Comparative study for electrodes fabricated by dry- and slurry-mixing processes", Journal of Power Sources, vol. 375, pp. 93-101, Jan. 31, 2018.

(Continued)

*Primary Examiner* — Brian R Ohara
*Assistant Examiner* — Emily Elizabeth Freeman
(74) *Attorney, Agent, or Firm* — Rabin & Berdo, P.C.

(57) ABSTRACT

Provided is a solid electrolyte membrane including a porous frame including a metal or a polymer material, solid electrolyte particles covering both surfaces of the porous frame, (Continued)

and filling pores of the porous frame, and a binder between the solid electrolyte particles.

8 Claims, 5 Drawing Sheets

(56) References Cited

U.S. PATENT DOCUMENTS

| | | | |
|---|---|---|---|
| 2013/0337337 A1 | 12/2013 | Lee et al. | |
| 2014/0217013 A1* | 8/2014 | Sato | H01M 50/423 |
| | | | 428/398 |
| 2015/0221981 A1 | 8/2015 | Lee et al. | |
| 2016/0268638 A1 | 9/2016 | Jang et al. | |
| 2019/0260070 A1* | 8/2019 | Kishimoto | H01M 4/133 |
| 2019/0280336 A1 | 9/2019 | Ye et al. | |
| 2019/0334178 A1* | 10/2019 | Senoue | H01M 10/0525 |
| 2021/0202990 A1 | 7/2021 | Lee et al. | |
| 2021/0320332 A1 | 10/2021 | Lee et al. | |
| 2022/0006118 A1 | 1/2022 | Yan et al. | |
| 2022/0123353 A1* | 4/2022 | Fu | H01M 10/4235 |
| 2022/0131231 A1* | 4/2022 | Du | H01M 10/0562 |
| 2024/0243325 A1* | 7/2024 | Shimizu | H01M 4/9025 |

FOREIGN PATENT DOCUMENTS

| | | |
|---|---|---|
| KR | 20010092802 A | 10/2001 |
| KR | 20120089413 A | 8/2012 |
| KR | 1020160109604 A | 9/2016 |
| KR | 1020180057135 A | 5/2018 |
| KR | 1020180115130 A | 10/2018 |
| KR | 101953738 B1 | 3/2019 |
| KR | 1020200069256 A | 6/2020 |
| KR | 20200111559 A | 9/2020 |
| KR | 20200129728 A | 11/2020 |
| WO | 2020087873 A1 | 5/2020 |
| WO | 2020117001 A1 | 6/2020 |
| WO | 2020252427 A1 | 12/2020 |

OTHER PUBLICATIONS

Yoshikatsu Seino et al., "A sulphide lithium super ion conductor is superior to liquid ion conductors for use in rechargeable batteries", Energy & Environmental Science, Issue 2, pp. 627-631, Jan. 23, 2014.

Extended European Search Report dated Jan. 8, 2025, in the counterpart European Patent Application No. 22756544.7.

* cited by examiner

POROUS FRAME-BASED SOLID ELECTROLYTE MEMBRANE AND MANUFACTURING METHOD THEREOF, AND ALL-SOLID-STATE BATTERY INCLUDING THE SAME

CROSS-REFERENCE TO RELATED APPLICATIONS

This U.S. non-provisional patent application claims priority under 35 U.S.C. § 119 of Korean Patent Application No. 10-2021-0022855, filed on Feb. 19, 2021, and No. 10-2021-0060500, filed on May 11, 2021, the entire contents of which are hereby incorporated by reference.

BACKGROUND

The present disclosure herein relates to a porous frame-based solid electrolyte membrane and a manufacturing method thereof, and an all-solid-state battery including the porous frame-based solid electrolyte membrane.

Lithium-ion batteries are energy storage devices with high energy density and stable output properties, and are variously applied to mobile IT to electric vehicles (EVs) and energy storage systems (ESS). However, lithium-ion batteries use organic electrolytes with a high risk of ignition and operate in a high voltage range, fire accidents may occur due to unexpected behavior. In addition, in recent years, the industry of secondary batteries is rapidly shifted from small secondary batteries such as power sources for portable devices to medium to large secondary batteries such as electric vehicles and energy storage systems, so that the stability problem is becoming more of a serious issue.

In order to secure the stability of lithium-ion batteries, various methods are being applied. Among them, the development of a solid electrolyte has become the biggest issue in recent years. When a ceramic-based solid electrolyte having a separator function is used, the structure of a battery is simplified, there is no risk of leakage, ignition, and explosion of the electrolyte, and the use of a high-voltage electrode is not limited due to excellent electrochemical stability of the electrolyte. In addition, since a lithium metal having a theoretical capacity of 10 times or more than that of a graphite material commercially available as a typical negative electrode material may be used, the electrolyte may be extended to an electrolyte for a lithium-air battery or a lithium-sulfur battery, and thus, may dramatically improve energy density for mass and volume.

SUMMARY

The present disclosure provides a thin-film solid electrolyte membrane and a manufacturing method thereof, and an all-solid-state battery including the thin-film solid electrolyte membrane.

An embodiment of the inventive concept provides a solid electrolyte membrane including a porous frame including a metal or a polymer material, solid electrolyte particles covering both surfaces of the porous frame, and filling pores of the porous frame, and a binder between the solid electrolyte particles.

In an embodiment of the inventive concept, a method for manufacturing a solid electrolyte membrane includes stirring a mixture including solid electrolyte particles and a binder, providing the mixture on the surface of a porous frame, and compressing the porous frame provided with the mixture, wherein the porous frame includes a metal or a polymer material, and the solid electrolyte particles and the binder cover both surfaces of the porous frame and fill pores of the porous frame.

In an embodiment of the inventive concept, an all-solid-state battery includes a positive electrode, a negative electrode, and a solid electrolyte, wherein the solid electrolyte may be the solid electrolyte membrane.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In order to facilitate sufficient understanding of the configuration and effects of the inventive concept, preferred embodiments of the inventive concept will be described with reference to the accompanying drawings. However, the inventive concept is not limited to the embodiments set forth below, and may be embodied in various forms and modified in many alternate forms. Rather, these embodiments are provided so that this disclosure will be thorough and complete, and will fully convey the scope of the inventive concept to those skilled in the art to which the inventive concept pertains. In the accompanying drawings, elements are illustrated enlarged from the actual size thereof for convenience of description, and the ratio of each element may be exaggerated or reduced.

Figure 1:
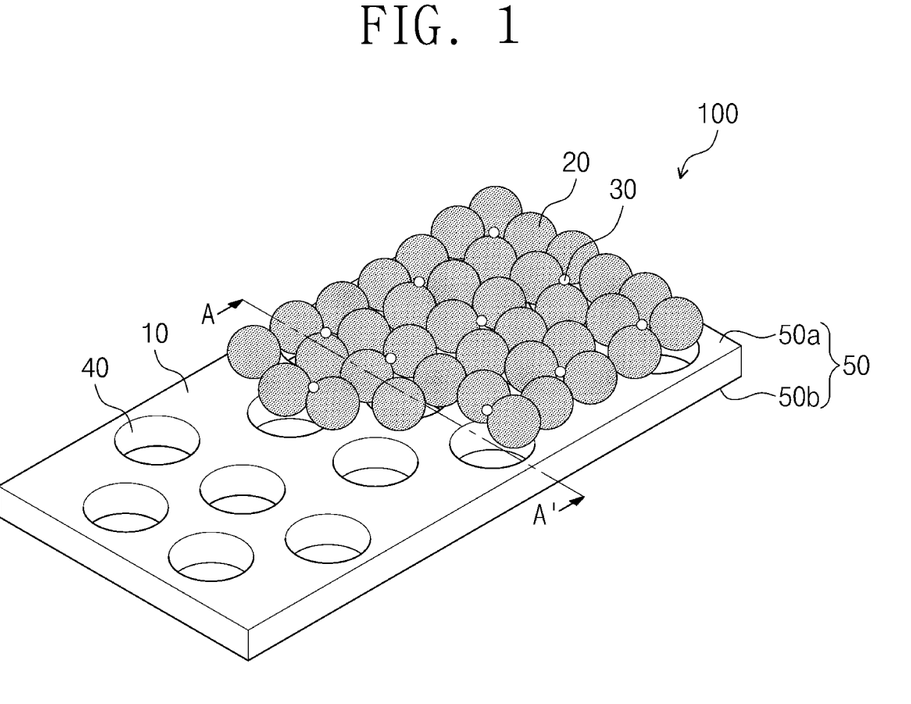
FIG. 1 is a schematic perspective view showing a porous frame-based solid electrolyte membrane according to some embodiments of the inventive concept.
Figure 2:
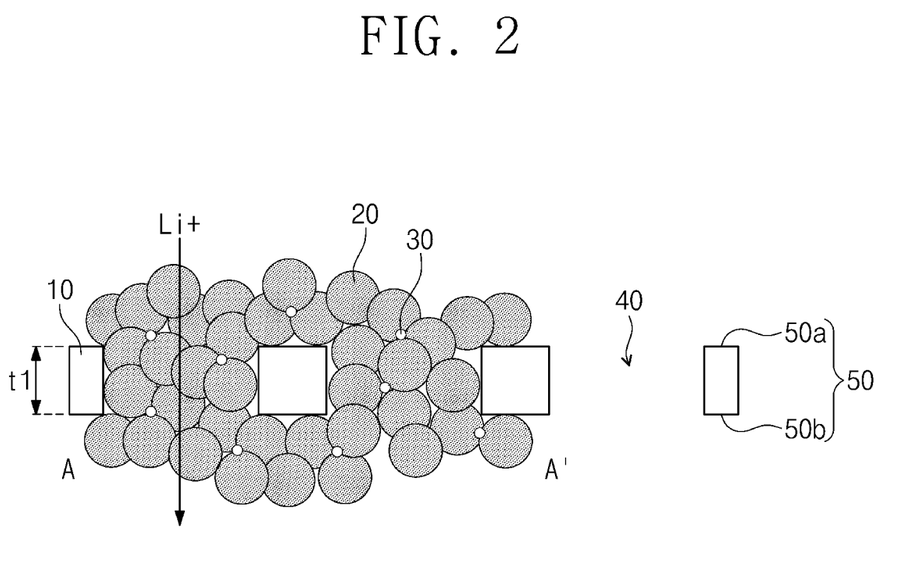
FIG. 2 and FIG. 3 are cross-sectional views showing a porous frame-based solid electrolyte membrane according to some embodiments of the inventive concept.
Figure 3:
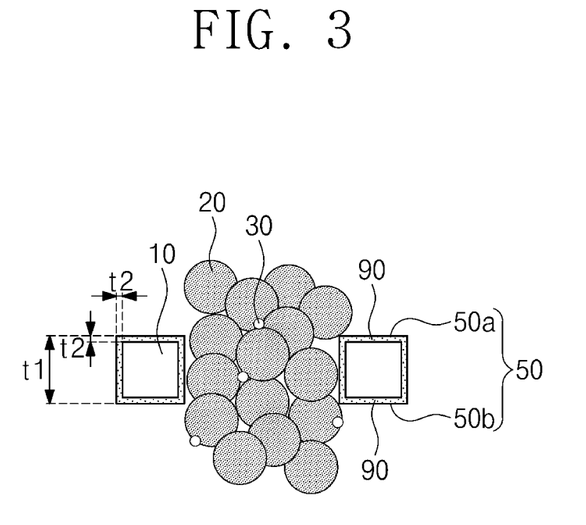

FIG. 1 is a schematic perspective view showing a porous frame-based solid electrolyte membrane according to some embodiments of the inventive concept. FIG. 2 and FIG. 3 are cross-sectional views showing a porous frame-based solid electrolyte membrane according to some embodiments of the inventive concept.

Referring to FIG. 1 to FIG. 3, a solid electrolyte membrane 100 may include a porous frame 10, solid electrolyte particles 20, and a binder 30.

The porous frame 10 may include a metal or a polymer material. The porous frame 10 may include a pore 40 penetrating the inside thereof. The pore 40 may be an empty space extending from an upper surface 50a of the porous frame to a lower surface 50b thereof. The pore 40 may be provided in plurality in the porous frame 10, the plurality of pores 40 may be disposed spaced apart from each other. A thickness t1 of the porous frame 10 may be 1 um to 200 um.

The porous frame 10 may include a polymer material. As an example, the polymer material may include at least one of polyethylene (PE), polypropylene (PP), cellulose, polyethylene terephthalate (PET), polybutylene terephthalate (PBT), polyacrylonitrile (PAN), polystyrene (PS), polyvinyl chloride (PVC), polycarbonate (PC), polymethyl methacrylate (PMMA), nylon, polytetrafluoroethylene (PTFE), polyvinylidene fluoride (PVDF), a copolymer of vinylidene fluoride and hexafluoropropylene (PVDF-HFP), polyimide (PI), polyisoimide (PEI), a liquid crystal polymer film (LCP), polyoxymethylene (POM), polysiloxane, acrylonitrile butadiene styrene (ABS), an epoxy resin, a phenol resin, polysulfone (PSF), polyethersulfone (PES), or polyetheretherketone (PEEK). When the porous frame 10 includes a polymer material, the porous frame 10 may be in the form of a film made of the polymer material.

The porous frame 10 may include a metal material. As an example, the metal material may include at least one of Cu, Al, Ni, Stainless steel(SUS), Ti, Zn, or Mg. The porous frame 10 may be in the form of a foil made of the metal material.

When the porous frame 10 includes a metal material, an insulation layer 90 covering both surfaces 50 of the porous frame 10 and inner surfaces of the pores 40 may be provided. The insulation layer 90 may reduce the occurrence of short circuit or leakage current in a battery, and may improve adhesion force of the solid electrolyte particles 20 to the porous frame 10. A thickness t2 of the insulation layer 90 may be 10 nm to 10 um, and may be less than the thickness t1 of the porous frame 10.

The insulation layer 90 may include a metal oxide film. As an example, the metal oxide film may include at least one of a copper oxide (CuO), an aluminum oxide ($Al_2O_3$), a nickel oxide (NiO, $Ni_2O_3$, or $NiO_2$), an iron oxide (FeO, $Fe_2O_3$, or $Fe_3O_4$), a titanium oxide ($TiO_2$), a zinc oxide (ZnO), or a magnesium oxide (MgO).

The solid electrolyte particles 20 may cover the both surfaces 50 of the porous frame 10, and may fill the pores 40 of the porous frame 10. The solid electrolyte particles 20 may include a lithium-ion conductive material. As an example, the lithium-ion conductive material may include at least one of a NASICON-based electrolyte (LATP, LAGP), an oxide-based electrolyte (Garnet structure LLZO, Perovskite LLTO), a sulfide-based electrolyte (LPS, LPSCl), or a polymer electrolyte (solvent-free-based and gel electrolyte).

The binder 30 may be disposed among the solid electrolyte particles 20. The composition ratio of the solid electrolyte particles 20 and the binder 30 may be 20:80 to 99:1 by weight. When the composition ratio of the binder 30 is higher than the above-proposed numerical value range, the ion conductivity of the solid electrolyte membrane 100 may be decreased. When the composition ratio of the binder 30 is lower than the above-proposed numerical value range, the adhesion force of the solid electrolyte particles 20 to the porous frame 10 may decrease.

Figure 4:
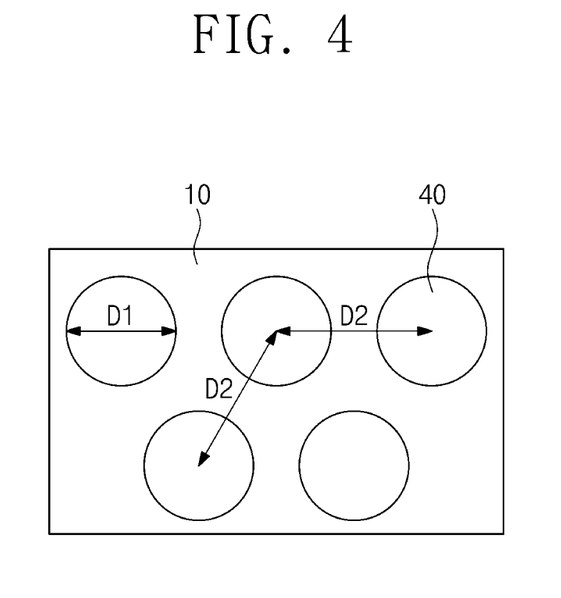
FIG. 4 is a plan view showing a porous frame-based solid electrolyte membrane according to some embodiments of the inventive concept.

FIG. 4 is a plan view showing a porous frame-based solid electrolyte membrane according to some embodiments of the inventive concept.

Referring to FIG. 4, the pore 40 may be circular. When the pore 40 is circular, a diameter D1 of the pore 40 may be 0.1 um to 50,000 um, and a distance D2 from the center of the pore 40 to the center of the most adjacent pore 40 may be 0.15 um to 75,000 um.

Hereinafter, a method for manufacturing a porous frame-based solid electrolyte membrane according to the inventive concept will be described.

Figure 5:
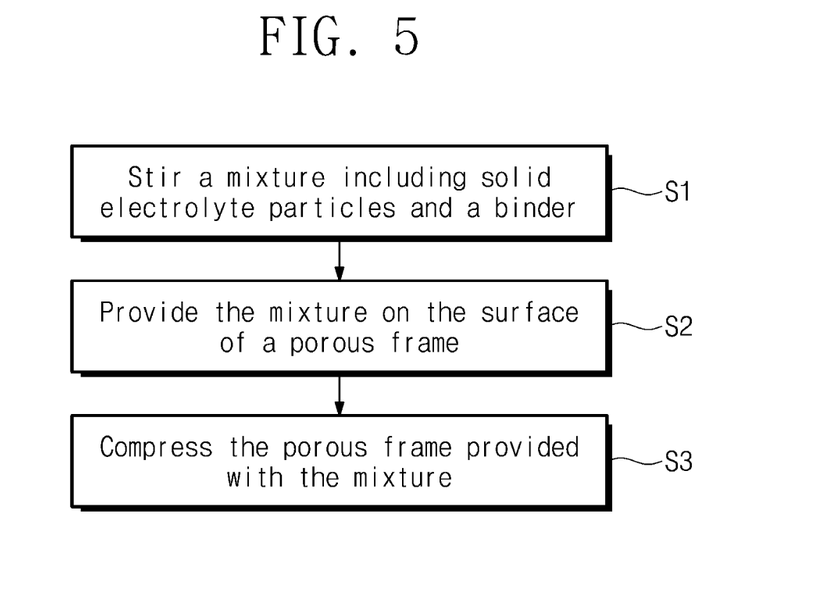
FIG. 5 is a flowchart for describing a method for manufacturing a porous frame-based solid electrolyte membrane according to some embodiments of the inventive concept.

FIG. 5 is a flowchart for describing a method for manufacturing a porous frame-based solid electrolyte membrane according to some embodiments of the inventive concept.

Referring to FIG. 1 and FIG. 5, a method for manufacturing a solid electrolyte membrane according to an embodiment of the inventive concept may include stirring a mixture including the solid electrolyte particles 20 and the binder 30 S1, providing the mixture on the surface of the porous frame 10 S2, and compressing the porous frame 10 provided with the mixture S3. The porous frame 10 may include a metal or a polymer material. The solid electrolyte particles 20 and the binder 30 may cover both surfaces of the porous frame 10, and may fill pores 40 of the porous frame 10.

According to some embodiments, the mixture may further include a cosolvent. In this case, the method for manufacturing a solid electrolyte membrane may include performing a wet process using the mixture.

Hereinafter, a method for manufacturing a solid electrolyte membrane based on a wet process will be described in more detail.

The mixture including the solid electrolyte particles 20 and the binder 30 may further include a cosolvent. As an example, the binder 30 may include at least one of butadiene rubber, fluorine-based rubber, nitrile butadiene rubber, hydrogenated nitrile butadiene rubber, styrene butadiene rubber, styrene butadiene styrene, styrene ethylene butadiene styrene, acrylated styrene butadiene rubber, an acrylonitrile butadiene styrene copolymer, polytetrafluoroethylene, polyvinylidene fluoride, a copolymer of vinylidene fluoride and hexafluoropropylene, polyvinyl chloride, polyacrylonitrile, polymethyl methacrylate, polyacrylate, polyethylene, polypropylene, a polyethylene oxide, polyimide, polyethylene terephthalate, polybutylene terephthalate, polyphenylsulfide, polyetheretherketone, or tetrafluoroethylene. As an example, the cosolvent may include at least one of hexane, heptane, nonane, decane, benzene, toluene, xylene, anisole, cyclohexanone, methyl ethyl ketone, tetrahydrofuran, N-methylpyrrolidone, hexamethylphosphoramide, dioxane, tetramethylurea, triethylphosphate, trimethylphosphate, dimethylformamide, dimethylsulfoxide, or dimethylacetamide.

Hereinafter, as an example of the method for manufacturing a solid electrolyte membrane based on a wet process, Step S2 of providing the mixture on the surface of the porous frame 10 may include directly coating the mixture on the both surfaces 50 of the porous frame 10 and on the inner surface of the pore 40.

Hereinafter, as another example of the method for manufacturing a solid electrolyte membrane based on a wet process, the method for manufacturing a solid electrolyte membrane may further include, after Step S1 of stirring a mixture including the solid electrolyte particles 20 and the binder 30, casting the mixture and drying the cosolvent of the mixture to manufacture a solid electrolyte film. In this case, Step S2 of providing the mixture on the surface of the porous frame 10 may include laminating the solid electrolyte film on the both surfaces 50 of the porous frame 10 and on the inner surface of the pore 40.

According to other embodiments, the mixture may not include a cosolvent. In this case, the method for manufacturing a solid electrolyte membrane may include performing a dry process using the mixture.

Hereinafter, a method for manufacturing a solid electrolyte membrane based on a dry process will be described in more detail.

The method for manufacturing a solid electrolyte membrane based on a dry process may further include, after stirring a mixture including the solid electrolyte particles 20 and the binder 30, adding an aprotic or non-polar solvent to the mixture. During the stirring, the temperature may be 25° C. to 100° C.

As an example, the binder 30 may include at least one of polytetrafluoroethylene, polyvinylidene fluoride, a copolymer of vinylidene fluoride and hexafluoropropylene, a copolymer of vinylidene fluoride and trifluoroethylene, or a terpolymer of vinylidene fluoride, trifluoroethylene and chlorotrifluoroethylene.

The aprotic or non-polar solvent has a low boiling point, and thus, may be easily volatilized. As an example, the aprotic or non-polar solvent may include at least one of hexane, benzene, toluene, xylene, cyclohexanone, or methyl ethyl ketone. The mixture added with the aprotic or non-polar solvent may temporarily exhibit fluidity. The composition ratio of the mixture and the aprotic or non-polar solvent may be 1:0.05 to 1:2 by weight. When the composition ratio of the aprotic or non-polar solvent is higher than the above-proposed numerical value range, the fluidity of the mixture added with the aprotic or non-polar solvent is high, so that it may not be easy to control the thickness of the solid electrolyte membrane 100. When the composition ratio of the aprotic or non-polar solvent is lower than the above-proposed numerical value range, the fluidity of the mixture added with the aprotic or non-polar solvent is low, so that it may not be easy to process the mixture.

Hereinafter, as an example of the method for manufacturing a solid electrolyte membrane based on a dry process, Step S2 of providing the mixture on the surface of the porous frame 10 may include directly coating the mixture added with the aprotic or non-polar solvent on the both surfaces 50 of the porous frame 10 and on the inner surface of the pore 40.

Hereinafter, as another example of the method for manufacturing a solid electrolyte membrane based on a dry process, the method for manufacturing a solid electrolyte membrane may further include, after Step S1 of stirring a mixture including the solid electrolyte particles 20 and the binder 30, casting the mixture added with the aprotic or non-polar solvent and cooling the mixture to manufacture a solid electrolyte film. Step S2 of providing the mixture on the surface of the porous frame 10 may include laminating the solid electrolyte film on the both surfaces 50 of the porous frame 10 and on the inner surface of the pore 40.

Figure 6:
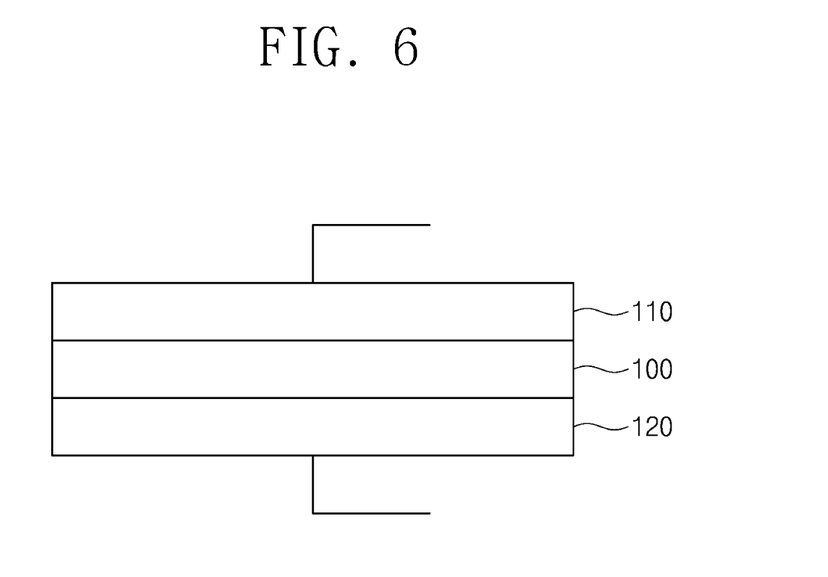
FIG. 6 is a cross-sectional view schematically showing an all-solid-state battery including a porous frame-based solid electrolyte membrane according to some embodiments of the inventive concept.

FIG. 6 is a cross-sectional view schematically showing an all-solid-state battery including a porous frame-based solid electrolyte membrane according to some embodiments of the inventive concept.

Referring to FIG. 6, an all-solid-state battery may include a positive electrode 110, a negative electrode 120, and a solid electrolyte membrane, and the solid electrolyte membrane may be any one of the above-described solid electrolyte membranes 100.

Figure 7:
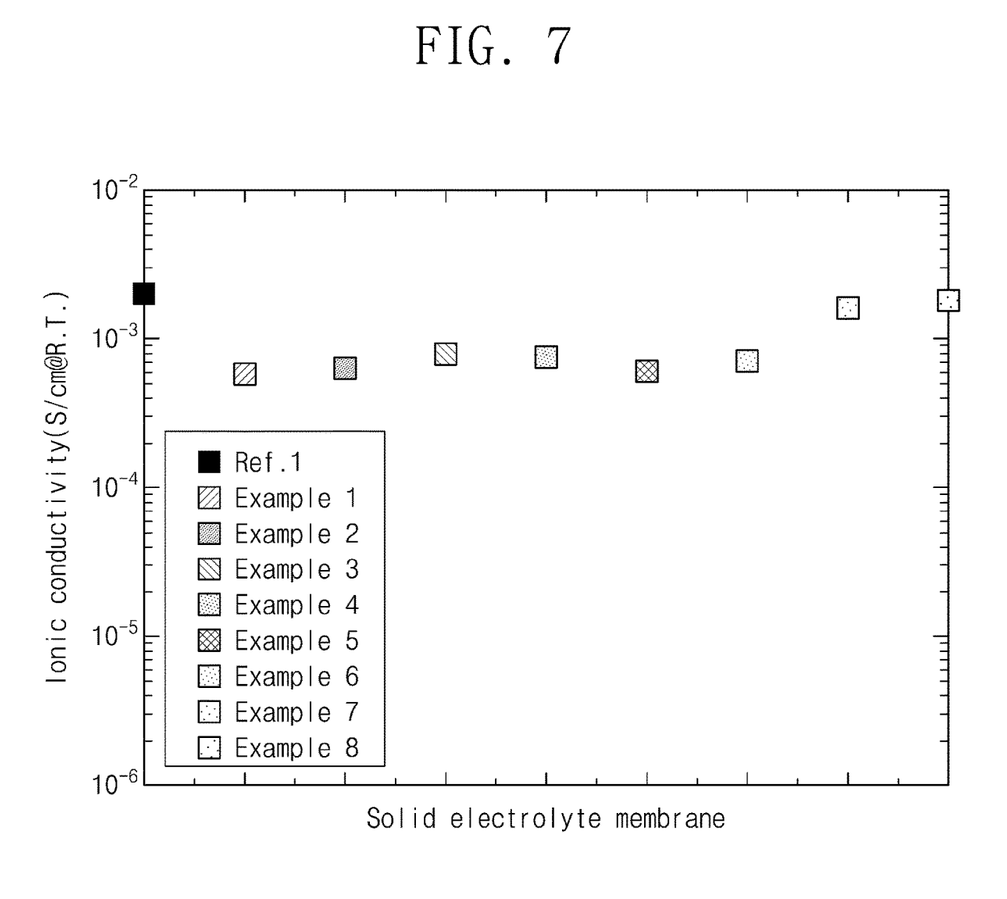
FIG. 7 is a graph showing the room-temperature ion conductivity properties of a solid electrolyte membrane of each of Experimental Examples 1 to 8 and Comparative Example 1.

FIG. 7 is a graph showing the room-temperature ion conductivity properties of a solid electrolyte membrane of each of Experimental Examples 1 to 8 and Comparative Example 1. Hereinafter, Experimental Examples 1 to 8 and Comparative Example 1 will be described in detail.

Experimental Example 1

A solid electrolyte membrane in which LPSCl was applied as solid electrolyte particles and nitrile butadiene rubber (NBR) was applied as a binder was manufactured through a wet process. A porous frame was composed of nickel, and circular pores were arranged at regular intervals. The solid electrolyte membrane was manufactured such that the average diameter of the pore was 200 um, the interval between pores was 760 um, and the porosity of the frame was 23%, and the thickness of the frame was 10 um. A NiO oxide layer was formed to a thickness of 25 nm on both surfaces for the purpose of insulation through surface oxidation treatment. A mixture was prepared in which LPSCl (Argyrodite) and NBR were dissolved in a xylene/cyclohexanone mixed cosolvent in a composition ratio of 1:1 by weight. The concentration of cyclohexanone in a xylene solvent is 40%. The mixture was coated on one surface of the porous frame and dried at room temperature, and then the mixture was coated again on the opposite side of the porous frame and dried at room temperature to manufacture a solid electrolyte membrane with both surfaces coated. Thereafter, the solid electrolyte membrane was compressed, and finally, a solid electrolyte membrane with a thickness of 25 um was manufactured. A blocking electrode (SUS/solid electrolyte membrane/SUS) was applied to both surfaces of the manufactured solid electrolyte membrane, and the ion conductivity of the solid electrolyte membrane was calculated through an impedance measurement at room temperature.

Experimental Example 2

Unlike Experimental Example 1, the mixture was cast on a Teflon sheet, and then dried at room temperature to manufacture a solid electrolyte film. The same process as in Experimental Example 1 was performed except that the solid electrolyte film was applied to both surfaces of the nickel porous frame to manufacture a solid electrolyte film through lamination at 40° C.

Experimental Example 3

A solid electrolyte membrane in which LPSCl was applied as solid electrolyte particles and PTFE particles were applied as a binder in a weight ratio of 98:2 was manufactured through a wet process. The average diameter of the PTFE particles was 10 um. A mixture of LPSCl and PTFE particles were continuously stirred and melt at 40° C. to form a mixture in a liquid state. Thereafter, methyl ethyl ketone (MEK) was added such that the composition ratio of the mixture and MEK (an aprotic or non-polar solvent) became 1:0.3 by weight, and a solid electrolyte membrane was manufactured through coating and room temperature drying processes as in the same manner as in Experimental Example 1.

Experimental Example 4

A mixture in a liquid state whose viscosity was controlled with MEK was manufactured in the same manner as in Experimental Example 3, and a solid electrolyte membrane was prepared through a lamination process under the same conditions as in Experimental Example 2.

Experimental Example 5

The same process as in Experimental Example 1 was performed except that LPSCl and NBR were applied in a composition ratio of 99:1 by weight.

Experimental Example 6

The same process as in Experimental Example 2 was performed except that LPSCl and NBR were applied in a composition ratio of 99:1 by weight.

Experimental Example 7

The same process as in Experimental Example 3 was performed except that LPSCl and PTFE were applied in a composition ratio of 99:1 by weight.

Experimental Example 8

The same process as in Experimental Example 4 was performed except that LPSCl and PTFE were applied in a composition ratio of 99:1 by weight.

Comparative Example 1

LPSCl solid electrolyte particles were pressurized to 500 MPa to manufacture a solid electrolyte in a pellet form having a thickness of 400 um and a diameter of 1.2 cm. A blocking electrode (SUS/solid electrolyte/SUS) was applied to both surfaces of the manufactured solid electrolyte, and the ion conductivity of the solid electrolyte was calculated through an impedance measurement at room temperature.

Referring to FIG. 7, it is observed that the ion conductivity of each of Experimental Examples 1 to 8, which are solid electrolytes in a membrane form, was close to the ion conductivity of Comparative Example 1, which is a typical solid electrolyte in a pellet form. This may be because lithium ions only moved within a porous structure, and thus, loss of ion conductivity was minimized due to a simple and short movement path. Therefore, compared to Comparative Example 1, the solid electrolytes in a membrane form of each of Experimental Examples 1 to 8 are advantageous for being thinner and larger due to the high tensile strength of the porous frame, while maintaining a similar level of ion conductivity.

Figure 8:
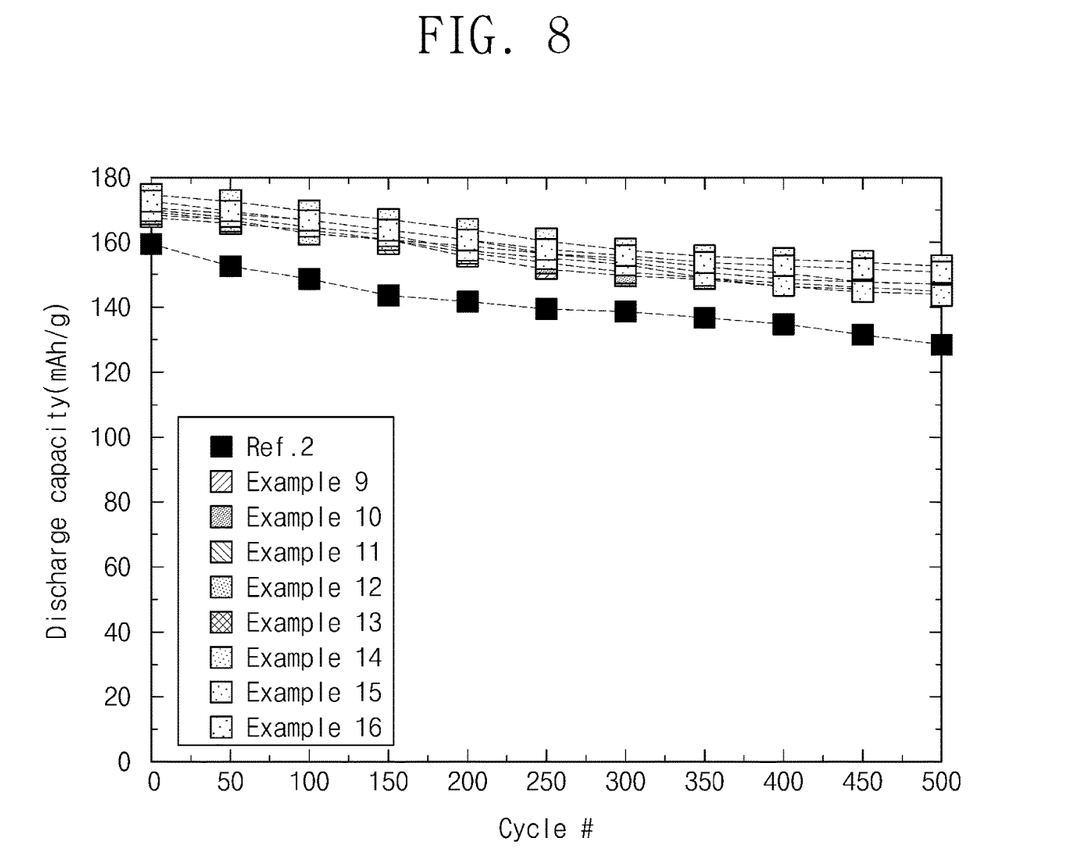
FIG. 8 is a graph showing initial specific capacity, and specific capacity retention properties according to lifespan of a solid electrolyte membrane-based single cell of each of Experimental Examples 9 to 16 and Comparative Example 2.

FIG. 8 is a graph showing initial specific capacity, and specific capacity retention properties according to lifespan of a solid electrolyte membrane-based single cell of each of Experimental Examples 9 to 16 and Comparative Example 2. Hereinafter, Experimental Examples 9 to 16 and Comparative Example 2 will be described in detail.

Experimental Example 9

A single cell (monocell) of an all-solid-state battery applied with a solid electrolyte membrane was manufactured. As a negative electrode, a lithium foil with a thickness of 50 um laminated on a copper current collector was applied. A positive electrode active material NCM622, a solid electrolyte LPSCl, and NBR and conductive additive (Carbon black, Super-P) were mixed in a weight ratio of 80:10:5:5, and the mixture was dissolved in a xylene co-solvent and stirred to prepare slurry. The slurry was coated on an aluminum current collector and roll-pressed to finally manufacture a positive electrode with a thickness of 30 um. The solid electrolyte membrane manufactured in Experimental Example 1 was inserted between the two electrodes to manufacture a pouch cell (2 cm×2 cm). A separate JIG was applied to maintain pressurization on both surfaces of the pouch cell. The pouch cell was connected to a charger/discharger, and CC-CV/CC charging/discharging was performed under the condition of 3.0 to 4.3 V cut-off and the current condition of C/5.

Experimental Example 10

The same process as in Experimental Example 9 was performed except that the solid electrolyte membrane of Experimental Example 2 was applied.

Experimental Example 11

The same process as in Experimental Example 9 was performed except that the solid electrolyte membrane of Experimental Example 3 was applied.

Experimental Example 12

The same process as in Experimental Example 9 was performed except that the solid electrolyte membrane of Experimental Example 4 was applied.

Experimental Example 13

The same process as in Experimental Example 9 was performed except that the solid electrolyte membrane of Experimental Example 5 was applied.

Experimental Example 14

The same process as in Experimental Example 9 was performed except that the solid electrolyte membrane of Experimental Example 6 was applied.

Experimental Example 15

The same process as in Experimental Example 9 was performed except that the solid electrolyte membrane of Experimental Example 7 was applied.

Experimental Example 16

The same process as in Experimental Example 9 was performed except that the solid electrolyte membrane of Experimental Example 8 was applied.

Comparative Example 2

A single cell to which the LPSCl solid electrolyte pellet of Comparative Example 1 was applied was manufactured. As a negative electrode, a lithium foil with a thickness of 50 um laminated on a copper current collector was applied. A positive electrode active material NCM622, a solid electrolyte LPSCl, and conductive additive (Carbon black, Super-P) were mixed in a weight ratio of 70:25:5, and the mixture was pressurized to 500 MPa to manufacture a positive electrode in a pellet form with a thickness of 450 um and a diameter of 1.2 cm. The solid electrolyte pellet manufactured in Comparative Example 1 was inserted between the two electrodes and inserted into a pressurization JIG to form a pressurization cell. The pressurization cell except for its terminal was again placed in a sealed container to block contact with moisture and air. The pressurization cell was connected to a charger/discharger, and CC-CV/CC charging/discharging was performed under the condition of 3.0 to 4.3 V cut-off and the current condition of C/5.

Referring to FIG. 8, it is observed that the single cell of each of Experimental Examples 9 to 16 to which the solid electrolyte membrane was applied had excellent initial specific capacity compared to the initial specific capacity of the single cell of Comparative Example 2 to which a typical solid electrolyte membrane in a pellet form was applied. In addition, it was observed that even when the charging/discharging was repeated for 500 times, the specific capacity of the single cell of each of Experimental Examples 9 to 16 was larger than the specific capacity of the single cell of Comparative Example 2, so that it can be confirmed that Experimental Examples 9 to 16 had excellent specific capacity retention properties according to lifespan compared to that of Comparative Example 2.

According to the inventive concept, a solid electrolyte membrane has a similar thickness and mechanical strength as a typical commercially available separator. Accordingly, the solid electrolyte membrane is readily available for deformation and punching, such as bending or rolling, and it is easy to allow the solid electrolyte membrane to have a large area. In addition, when manufacturing a cell, additional pressurization conditions are relaxed, and the structure of the cell is simplified, so that cell manufacturing process costs are lowered.

According to the inventive concept, unlike a typical commercially available separator, the solid electrolyte membrane itself has lithium-ion conductivity properties. Accordingly, the solid electrolyte membrane exhibits ion conductivity properties which are close to those of an electrolyte system including a separator and a liquid electrolyte.

The effects to be obtained by the present invention are not limited to the effects mentioned above, and other effects not mentioned will be clearly understood by those skilled in the art from the above description.

Embodiments of the present invention have been described with reference to the accompanying drawings. However, the present invention may be implemented in other detailed forms without changing the technical spirit or necessary features thereof. It is therefore to be understood that the above-described embodiments are illustrative in all aspects and not restrictive.

What is claimed is:

1. A solid electrolyte membrane for a lithium secondary battery, comprising:
   a porous frame comprising a metal or a polymer substrate and pores penetrating the substrate;
   solid electrolyte particles covering surfaces of the substrate, and filling the pores; and
   a binder between the solid electrolyte particles,
   wherein each of the pores is circular on a surface of the porous frame, and extends from an upper surface of the porous frame to a lower surface of the porous frame, intersecting across a thickness of the substrate,
   a depth of each of the pores is equal to the thickness of the substrate,
   wherein within an interior of the porous frame, the solid electrolyte particles are filled only at an empty space where the pores are formed,
   wherein each of the pores are arranged at regular intervals,
   wherein the lithium secondary battery comprises a positive electrode, a negative electrode and the solid electrolyte membrane interposed between the positive electrode and the negative electrode,
   wherein a composition ratio of the solid electrolyte particles and the binder is 95:5 to 99:1 by weight,
   wherein the solid electrolyte particles comprise at least one of LATP, LAGP, LLZO, LPS or LPSCl,
   wherein the metal comprises at least one of Cu, Al, Ni, stainless steel (SUS), Ti, or Zn, and
   wherein a diameter of a pore is 0.1 µm to 5,000 µm, and a distance from a center of the pore to a center of a most adjacent pore is 0.15 µm to 7,500 µm.

2. The solid electrolyte membrane of claim 1, wherein the thickness of the porous frame is 1 µm to 200 µm.

3. The solid electrolyte membrane of claim 1, wherein the solid electrolyte membrane further comprises an insulation layer covering both surfaces of the substrate.

4. The solid electrolyte membrane of claim 3, wherein the thickness of the insulation layer is less than the thickness of the porous frame.

5. The solid electrolyte membrane of claim 4, wherein the thickness of the insulation layer is 10 nm to 10 µm.

6. The solid electrolyte membrane of claim 3, wherein the insulation layer comprises a metal oxide film.

7. The solid electrolyte membrane of claim 3, wherein the solid electrolyte particles are spaced apart from the porous frame with the insulation layer interposed therebetween.

8. The solid electrolyte membrane of claim 1, wherein a diameter of the pores is greater than a thickness of the substrate.

* * * * *